United States Patent [19]

Bateson et al.

[11] Patent Number: 5,062,958
[45] Date of Patent: Nov. 5, 1991

[54] METHOD FOR WATER PURIFICATION

[75] Inventors: George F. Bateson, Roseville; Thomas J. Chresand, Minneapolis; Joel D. Moore, Bloomington; Terrence L. Nayes, Eden Prairie, all of Minn.

[73] Assignee: BioTrol, Inc., Chaska, Minn.

[21] Appl. No.: 486,805

[22] Filed: Feb. 28, 1990

Related U.S. Application Data

[62] Division of Ser. No. 193,362, May 12, 1988, Pat. No. 4,952,552.

[51] Int. Cl.$^5$ .............................................. C02F 3/06
[52] U.S. Cl. ................................. 210/611; 210/615; 210/617; 435/262; 435/264
[58] Field of Search ............... 210/615, 616, 617, 618, 210/611, 620; 435/262, 264

[56] References Cited

U.S. PATENT DOCUMENTS

| | | | |
|---|---|---|---|
| 49,013 | 7/1865 | Tilden | 210/254 |
| 60,445 | 12/1866 | Weyde | 210/255 |
| 623,439 | 4/1899 | Suman | 210/284 |
| 1,465,968 | 8/1923 | Caps | 210/293 |
| 1,657,822 | 1/1928 | Frechou | 210/255 |
| 1,991,896 | 2/1935 | Hays | 210/617 |
| 2,785,123 | 3/1957 | Stroud | 210/284 |
| 3,563,888 | 2/1971 | Klock | 210/150 |
| 3,700,590 | 10/1972 | Burton | 210/615 |
| 3,773,660 | 12/1973 | Hopwood | 210/617 |
| 3,878,097 | 4/1975 | Mochizuki et al. | 210/151 |
| 3,899,376 | 8/1975 | Ozarowicz | 210/611 |
| 4,045,344 | 8/1977 | Yokota | 20/106 |
| 4,169,050 | 9/1979 | Serfling et al. | 210/150 |
| 4,383,920 | 5/1983 | Muller et al. | 210/241 |

(List continued on next page.)

FOREIGN PATENT DOCUMENTS 0213691  3/1987  European Pat. Off. .
62-74491  4/1987  Japan .
799826  8/1958  United Kingdom .

OTHER PUBLICATIONS

Huang, C. S., "Some Experiences with Fixed-Film Biological Processes", Fixed-Film Biological Processes for Wastewater Treatment.

(List continued on next page.)

*Primary Examiner*—Stanley S. Silverman
*Assistant Examiner*—Christopher Upton
*Attorney, Agent, or Firm*—Merchant, Gould, Smith, Edell, Welter & Schmidt

[57] ABSTRACT

An arrangement for operation to reduce organic contaminant concentration in water passing therethrough as provided. The arrangement includes at least one reactor comprising a plurality of treatment chambers oriented in series, each chamber including an upstream downcomer portion and a downstream column portion separated by a wall member. Fluid flow is provided between a downcomer portion and the column portion. Means are provided such that water can flow through any associated chamber by introduction into an upper portion of the downcomer portion of the chamber, with passage downwardly to a feed space and a bottom portion of the column portion of the chamber and upwardly through the column portion. The water then flows outwardly from the chamber, into a next downstream chamber if one is provided. Each chamber includes a by-pass arrangement in association therewith, whereby should the column portion become temporarily occluded or plugged water backed up in the next upstream downcomer portion can overflow from an upper part of the downcomer portion across the column portion and above packing material therein, and into the next downstream chamber or, if none is provided, outwardly from the reactor. As a result of the by-pass arrangement, the arrangement according to the invention readily self-corrects for occlusion in any given column portion as a result of overdevelopement of biomass therein. A method is also provided for purification of water contamination with organics. In preferred applications, the method involves inoculating water fed through a staged reactor, to develop a preferred microorganism population profile through the reactor.

10 Claims, 8 Drawing Sheets

U.S. PATENT DOCUMENTS

| | | | |
|---|---|---|---|
| 4,444,664 | 4/1984 | Treyssac | 210/617 |
| 4,493,895 | 1/1985 | Colaruotolo et al. | 210/611 |
| 4,599,174 | 7/1986 | McDowell | 210/614 |
| 4,664,805 | 5/1987 | Focht | 435/262 |
| 4,680,111 | 7/1987 | Ueda | 210/150 |
| 4,803,166 | 2/1989 | Kulpa et al. | 435/262 |
| 4,859,594 | 8/1989 | Portier | 435/262 |

OTHER PUBLICATIONS

Buswell, A. M.; Pearson; E. L., Sewage Works Journal, 1, 187 (1929).

Iida, Y.; Teranishi; A. J., Water Pollut. Control Fed., 56, 251 (1984).

Young; J. C.; Stewart; M. C., Water & Wastes Engineering, Aug. 20 (1979).

Rusten, B. J.; Water Pollut. Control Fed., 56, 424 (1984).

Lee K. M.; Stensel, H. D. J. Water Pollut. Control Fed., 28, 1066 (1986).

Hamoda, M. F.; Abd-El-Bary, M. F. Wat. Res., 21, 939 (1987).

"Biological Treatment Systems: H-Series and L-Series", Detox, Inc.

"CTA BIOX Treatment Systems", Polybac Corporation.

Chresant; T. J., "Application of Bioreactors for Treatment of Toxic Wastewaters", BioTrol, Inc., paper presented May 24, 1988, Spokane, WA.

Hamoda; M. F.: Al-Haddad, A. A.; Abd-El-Bary, M. F. J. Biotechnol., 5, 279 (1987).

METHOD FOR WATER PURIFICATION

This ia a division of application Ser. No. 07/193,362, filed 5/12/88, now U.S. Pat. No. 4,952,552.

FIELD OF THE INVENTION

The present invention relates to water purification. In particular, the invention concerns an advantageous reactor structure, for biological treatment of contaminated water. A preferred method for water purification is also disclosed.

BACKGROUND OF THE INVENTION

The contamination of water with organics, both toxic and non-toxic, has been an ever increasing problem. For example, many industrial processes give rise to waste water streams having contaminating organics therein. Generally, such streams should be treated for the removal of the organics, prior to their discharge into treatment works, lakes, rivers, groundwater supplies, etc. Also, dump sites for organic materials may leak into local groundwater supplies. When this occurs, the groundwater often must be pumped and treated, to prevent the spread of contaminants from the area local to the dump site, by means of the groundwater system.

As suggested previously, the contaminating organics may be either toxic or non-toxic. Both can cause problems. However, non-toxic contaminants generally provide only cosmetic problems, i.e. unpleasant smell, turbidity, color, etc. Toxic compounds may pose an actual health hazard to humans, animals, and/or plants. In either case, it is desirable to remove the organics from the contaminated water, at least to some, reasonable, extent.

Three general classes of methods for removing contaminating organics from water have been developed. These are chemical treatments, biological treatments and physical treatments. Chemical treatments generally involve the introduction of a strong oxidizing agent into the wastewater stream. The contaminating organics are, as a result, partially or fully oxidized to carbon dioxide and water. Examples of oxidizing agents include ozone, chlorine dioxide and hydrogen peroxide.

While in some instances chemical purifications may be desirable, in many they pose problems. First, hazardous chemicals are required. Secondly, they can be relatively expensive. Thirdly, on a large scale, oxidation processes may be relatively slow, unless the oxidant is used in very large amounts.

Physical treatments are also known. These include, for example, carbon adsorption and air stripping. Such methods can be effective in some applications, however they are non-destructive of the toxic material, and thus disposal problems remain.

Biological treatments have been used in a wide variety of applications. Generally, the treatments involve contacting wastewater with a consortium (community) of microorganisms that utilize the dissolved organics as nutrients. In many applications, biological treatments have been difficult to develop, in-part because the contaminants to be removed, especially if highly toxic, have an adverse effect on the viability of many microorganisms.

A common reactor design employed in biological treatments is the mixed tank. For such systems, wastewater is fed to a tank, and aggregates or flocs of microorganisms are suspended in the water. With agitation the microorganisms and water are brought into intimate contact, and the microorganisms act on the organics to remove same from the water. The purified exit stream from the mixed tank generally still contains a suspension of microbial flocs, which are subsequently separated and returned to the treatment tank.

It is noted that the mixed tank reactor design is the basis for many of those activated sludge processes that are used in municipal wastewater treatment plants.

Another method for biological treatment, is to immobilize the microbial consortium in a reactor. The wastewater stream is then passed through the reactor, and the organics are removed. An example of this type of system is one generally referred to as a "trickling filter", in which a film of biomass is developed on a solid support such as rock, wood lath, or plastic packing. The waste stream trickles through the support, bringing the organics into contact with a microbes. Another example is the rotating biological contactor, (RBC), in which biomass laden discs are rotated in a trough, through which the waste stream is directed.

The trickling filter and the RBC are both examples of "fixed-film" biological reactors; that is, the active organisms are contained in an immobile film, which covers a solid support.

A variety of such systems have been developed. In general, for any system to be highly effective, the following concerns must be addressed:

1. First, there is the problem of regulating biomass growth. In some systems, the biomass will feed on the organics sufficiently, so that the fixed biomass will increase substantially. In a trickling filter, an increase in biomass may lead to a plugging of the filter. For an RBC, increase in biomass may inhibit rotational operation of the disc.

2. As previously suggested, it may be desirable to utilize a methodology of treatment including numerous different types of microorganisms in stages. Different stages of microorganisms may require a variety of treatment conditions, for effect. For example, the microorganisms of some stages may be anaerobic, whereas for others they are aerobic. Different temperature and/or nutrient needs may also be present. Also, microorganisms may be needed in one step of the process in order to remove substances toxic to microorganisms used in a later step in the process.

3. For a system to be commercially successful, it must be relatively efficient. It will be understood that very large volumes of water may be need to be treated, for the removal of organics. The water must be fed into, and removed from, the treatment facility. Preferably this is done with relatively low energy demands. Otherwise, the cost of running the plants may make the treatment process economically undesirable, even if the process is superior to others in terms of quality of clean water removed. More specifically, it must be noted that the product of wastewater cleaning is basically clean water, a resource which has relatively little commercial value in and of itself. The by-products, typically biomass waste, and carbon dioxide, also have little or no commercial value.

4. In some instances it may be necessary to set-up wastewater treatment facilities in a field, to handle contaminated water at remote locations. It would be preferred to have a system which is either readily portable, or at least is relatively inexpensive to set-up and take down.

5. In many instances, some of the contaminants in the water, or by-products from the biodegradation, are relatively volatile. It would be preferred to have a purification system wherein release of volatiles or the environment may be controlled, if desired.

6. Finally, if the water to be purified contains toxic materials, the arrangement must be adaptable to handle those materials. That is, materials potentially harmful to the microbial consortium in the reactor must be handlable.

It will be understood that the above list is not exhaustive, rather it generally represents major factors and concerns to be addressed by any effective wastewater purification system, especially those utilizing biological treatments. In general, there has been a need for the development of improved systems and methods, whereby these concerns are conveniently addressed preferably with everincreasing efficiency.

It is an object to the present invention to provide an arrangement for achieving purification of water contaminated with organics, in a manner which effectively addresses some or all of the above listed concerns. It is also an object of the present invention to provide a method whereby these concerns can be readily addressed, in a preferred manner. Other objects and advantages of the present invention will become apparent from the following descriptions, taken in connection with the accompanied drawings, wherein are set forth by way of illustration and examples certain embodiments of the present invention.

SUMMARY OF THE INVENTION

According to the present invention an arrangement is provided for operation to reduce organic contaminant concentration in water passing therethrough. In general, the arrangement includes at least one reactor comprising a plurality of treatment chambers oriented in series. The arrangement may include more than one reactor, for example in parallel. Each chamber of each reactor includes an upstream downcomer portion, and a downstrean column portion. The downcomer portion and column portion of each chamber are separated by a wall member, preferably an internal baffle. Flow communication is provided between a lower portion of each downcomer, and a lower portion of each associated column portion. The term "associated" and variants thereof, as used herein, as meant to refer to portions, components, parts, etc. of any selected chamber. For example, for the preferred embodiment a downcomer portion and an associated column portion are located within the same chamber.

Each column portion, for an operative reactor, is packed with column packing or biomass support material including immobilized active biomass thereon. Preferably, a support means or arrangement is provided, supporting the biomass support material above a bottom portion of the associated column portion. That is, each column portion includes a loading space in a bottom portion thereof. For a selected chamber, fluid flow from an associated downcomer portion is directed into the feed space of the associated column portion.

A drain arrangement is provided in association with each column portion. Each drain arrangement includes means for providing fluid flow outwardly from the associated column portion at a location above an upper level of packing material within the column portion, when the column portion is packed for operation. For each chamber, except the last downstream chamber in the reactor, the drain arrangement provides for fluid flow from the associated column portion to a next downstream chamber downcomer portion; i.e. the drain arrangement provides for fluid flow between chambers. For the last downstream chamber of a reactor, the drain arrangement provides for fluid flow outwardly from the reactor.

Preferred arrangements according to the present invention include a column portion bypass arrangement in association with each chamber. The column portion bypass arrangement is constructed and arranged to selectively direct fluid flow from a downcomer portion of an associated chamber, through a portion of the associated column portion and above plugged biomass support material therein, and to the associated drain arrangement. In this manner, plugged or partially plugged biomass support material within a column portion of any selected chamber can be bypassed or partially bypassed. More specifically, should a selected column portion become plugged, with water continuing to flow into the reactor, the water can back up in the downcomer channel and overflow therefrom into the next downstream column portion (the plugged column) above the plugged biomass support material, and then into the next downstream downcomer portion, i.e. into the next downstream chamber. In time, once fluid flow through the plugged column portion is re-established, the bypass arrangement will automatically cease directing fluid flow along a bypass path, and fluid flow will be directed through the previously occluded column portion.

It will be understood that in some instances the column will only be partially plugged, leading to a slower rate of fluid therethrough. Under such circumstances, the overflow arrangement can work in conjunction with flow in a normal manner, to lead to fluid flow through the arrangement. That is, both the overflow arrangement and normal flow may operate at the same time.

It follows that each downcomer portion includes a fluid inlet arrangement in association therewith, to provide for fluid flow through the reactor.

In a typical operation, fluid flow is directed into a most upstream downcomer portion near an upper portion thereof. The water flows outwardly into a lower portion of a downcomer, and into an associated column portion. More specifically, the water is directed into the feed space of the associated column portion. The water is directed upwardly through the column portion, and is treated by biomass material therein. The water then flows outwardly from an upper portion of the chamber, and into a next downstream downcomer. The process is repeated with each chamber in series, until fluid flow outwardly from the reactor is obtained. Again, should any column portion become temporarily occluded or plugged, the bypass arrangement associated therewith will automatically provide for fluid flow bypass around the plugged support material of that column portion. In this manner continual fluid flow without back up or flooding is provided. To advantage, by this a continual water and nutrient flow to biomass material throughout the reactor may be ensured, even though some upstream plugging may have occurred.

In preferred embodiments, each chamber is defined by a bottom wall and a side wall arrangement and includes a centrally located baffle member therein. Preferably, the baffle member is mounted suspended such that it has an upper portion and a bottom portion, the bottom portion being separated from a bottom wall of the chamber; and, the upper portion being below a top of the chamber, but above the drain arrangement for the associated chamber. In this manner, backed up water in a downcomer can flow over an upper portion of the associated baffle, without flooding outwardly from the chamber.

Preferably, each reactor according to the present invention includes at least two and sometimes five treatment chambers in series, so that a variety of environments can be readily developed. It is noted, however, that no limit on the number of columns which can be oriented in series is suggested.

Means facilitating different environments in different columns include nutrient feed means selectively oriented with any one or all of the chambers, and/or heating/cooling arrangements selectively provided in association with one or all of the chambers. Also, preferably, each chamber preferably has in association therewith introduction means for air, so that air can be selectively bubbled into the feed portion of each column and upwardly through column support material therein, as selected. As will be understood from the detailed description, air bubbling can be used to facilitate aerobic processes and also to facilitate flow of fluids through the reactor. It is noted that for some applications it may be desirable to conduct an anaerobic process in at least one of the column portions. When such is the case, the air introduction means associated with that column portion can be individually, selectively, closed off.

For preferred embodiments of the present invention, each chamber is generally rectangular in transverse cross-section, and each column is also preferably rectangular in transverse cross-section. Most preferably, each column portion has a height to transverse area ratio of between about 0.5 and 1.0. Generally, an advantage to the present invention is derived from the fact that rather than using relatively tall columns, a plurality of fairly short columns in series are provided. Preferably, each column is less than about $6^{ft}$, and preferably is between about $4^{ft}$ and $5^{ft}$, in height. Columns of such a size give a good level of dissolved $O_2$ throughout.

The present invention also concerns a method for purifying water contaminated with organics. Generally, the method comprises directing contaminated water through a reactor prepared as described above. In a preferred application, the method involves bubbling air through at least one of the column portions, to facilitate water flow through the reactor. This, in general, occurs as a result of the air bubbling in the column causing a low density of fluid water in a column portion, relative to the next upstream downcomer portion. As a result, the relatively dense fluid in the downcomer portions generally provides a force pushing the water through the next downstream column portion, with relatively little head loss.

A primary effectiveness of the reactor design is in the treatment of wasewaters having toxic components therein. The toxic compound is generally one which either kills or significantly inhibits the metabolism of most microorganisms. It should be noted, that while the compound may be toxic to a very large number of microorganisms, the diversity of natural microflora is such that at least some species will likely be resistant to the toxic compound to possess the ability to degrade it. Also, recalcitrance does not imply toxicity; that is, a compound may be extremely difficult to degrade and yet it will not kill or inhibit the metabolism of microorganisms. The successful biological treatment of a toxic wastewater depends strongly on harnessing the appropriate microorganisms. The biological system must contain a specialized microbial population which is able to degrade the toxic component of the wastestream, as well as a wide variety of microbes which degrade the balance of the soluble organics. These requirements can only be effectively met, with an appropriate reactor design.

A reactor design disclosed herein effectively addresses the treatment of toxic wastewaters, by establishment of distinct microbial populations in each section of the reactor. For example, those organisms most suited to degrade incoming toxic components to the wastestream will dominate the upstream columns. As a result, those organisms with low resistance to the toxic compounds but high reactivity with the non-toxics will be able to thrive in the downstream columns, and feed on the remaining soluble organics. This type of stage treatment is not possible in a mixed tank system, since the wastewater microorganisms are intermingled uniformly in the tank. Moreover, the effects of staged microbe populations are not realized by treatment with mixed tanks in series, since the microbes are not confined to a single tank, but rather are carried throughout the system. More specifically, the development of distinct, staged, populations generally depends on immobilization of microorganisms, such as can be obtained with a device according to the present disclosure.

Distinct microbe populations in the sequenced reactor disclosed, can arise spontaneously in the treatment of a given waste. In many instances, however, it is possible to establish a specific population in one or more columns through inoculation with a previously isolated characterized organism. This technique may be referred to as "amendment" of the biological consortium. An advantage to application of this technique is that an organism with highly desirable metabolic capabilities can be added to enhance the performance of the reactor.

The present invention includes a method of purifying water, through establishment of a preferred microbe population in a staged system by means of inoculation of feedwater, with selected microorganisms.

The drawings constitute a part of this specification, and include exemplary embodiments of the present invention while illustrating various objects and features thereof. It will be understood that in some instances, relative component sizes and relative material thicknesses are shown exaggerated, to facilitate an understanding of the invention.

DETAILED DESCRIPTION OF THE INVENTION

As required, detailed descriptions of the present invention are presented herein; however, it is to be understood that the disclosed embodiments are merely exemplary of the invention which may be embodied in various forms. Therefore, specific structural and functional details disclosed herein are not to be interpreted as limiting, but rather as a basis for the claims and as a representative basis for teaching one skilled in the art to variously employ the present invention and virtually any appropriately detailed system, structure, arrangement or manner.

Figure 1:
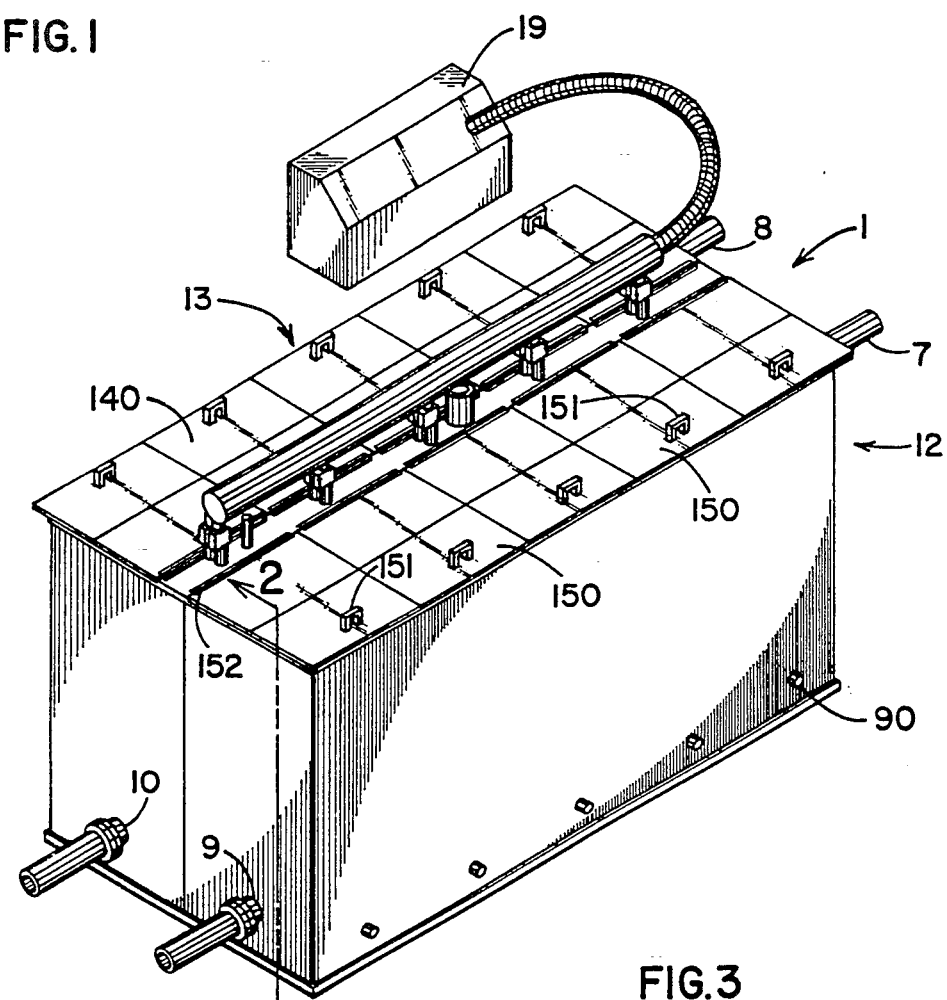
FIG. 1 is a perspective view of a bio-reactor arrangement according to the present invention.

The reference numeral 1, FIG. 1, generally designates a reactor arrangement according to the present invention. The reactor arrangement 1, FIG. 1, is representational only. It will be readily understood that variety of sizes, shapes and appearances of reactors may be developed in accordance with the principles of the present invention.

One of the purposes of FIG. 1 is to indicate that bio-reactors according to the present invention can be made relatively small. That is, they need not i.e. extremely tall, nor extremely long. Representative dimensions are given in further description below. From these it will be understood that some reactors according to the present invention can be transported on trucks, trailers or the like. Thus, they can be readily transported to remote locations, for use.

The arrangement 1, FIG. 1, includes a pair of water inlets 7 and 8, and a pair of water outlets 9 and 10; outlet 9 corresponding to inlet 7, and outlet 10 corresponding to inlet 8. Thus, arrangement 1 includes first and second parallel reactors or units 12 and 13; reactor 12 having inlet 7 and outlet 9, and, reactor 13 having inlet 8 and outlet 10. Each of reactors 12 and 13 comprises a plurality of reacting chambers, described in detail below, oriented in series. That is, as water passes through a reactor from the inlet to the outlet, it passes through a series of reacting chambers wherein the water is treated. In general, outlet water from outlets 9 and 10 is purified considerably, with respect to organics. If it is still not tested to be sufficiently pure, it may be recycled through the arrangement 1, or directed to other water purification devices and or arrangements, including, if desired, further arrangements such as arrangement 1.

In FIG. 1, arrangement 1 is depicted set-up in a field for operation and including in association therewith a blower arrangement 19. Purposes of the blower 19 will be understood from detailed description below. Inlet and outlet (water) fluid hoses are shown attached to the inlets and outlets.

Figure 2:
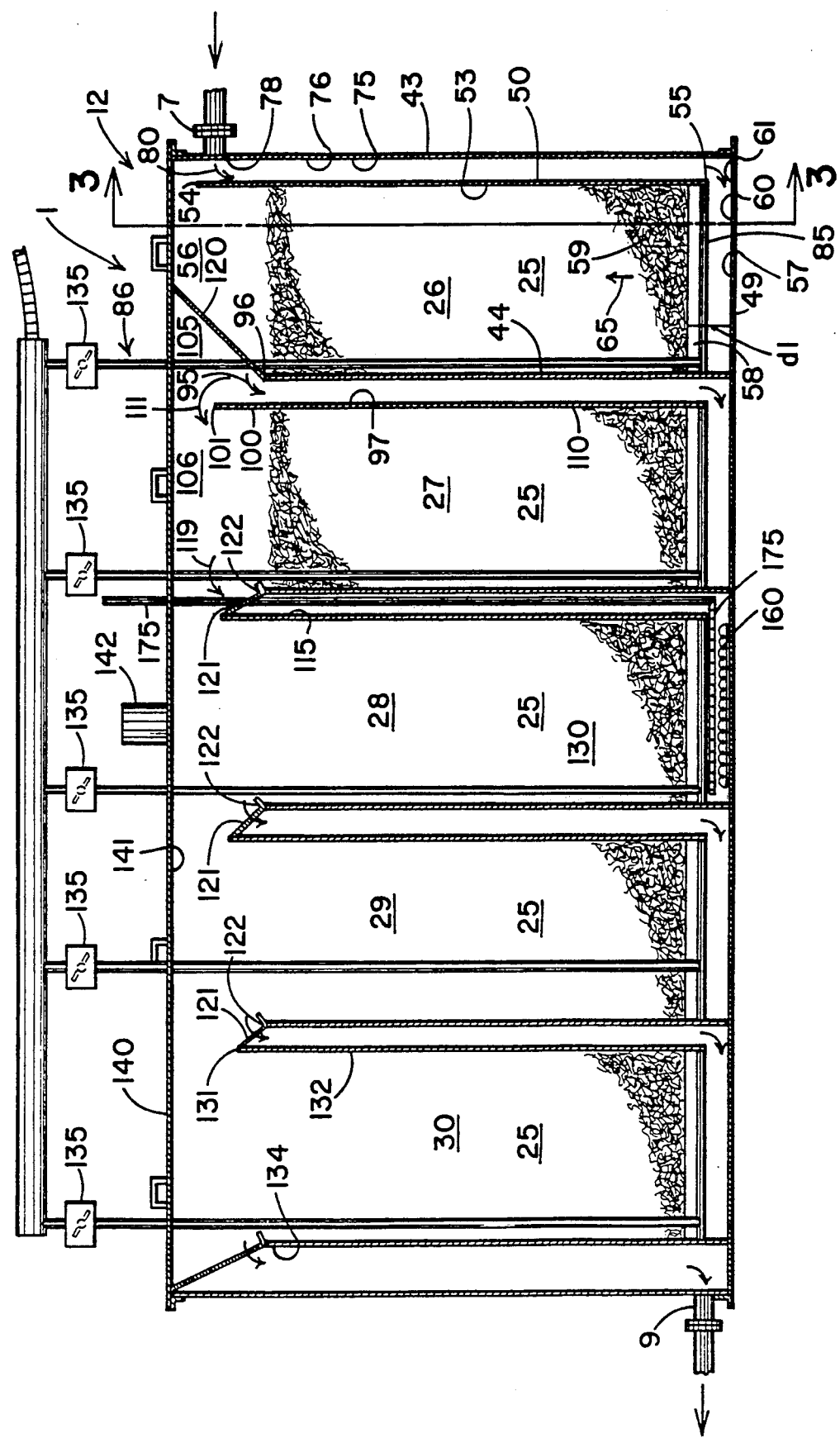
FIG. 2 is an enlarged, fragmentary, side cross-sectional view of the arrangement shown in FIG. 1, taken along line 2—2 thereof.

In FIG. 2 a side cross-sectional view of arrangement 1 is depicted. In particular, the cross-sectional view of FIG. 2 is taken through reactor 12. It will be understood that reactor 13 may be generally analogous.

Reactor 12 comprises a plurality of reactor chambers 25 oriented in series. For the arrangement shown, reactor 12 includes five such chambers, chambers 26, 27, 28, 29 and 30. It will be understood that each of chambers 26 through 30 may be substantially identical to the others, although they need not be the same. For example, some variations to improve performance are described below.

In general, each reaction chamber includes: a downstream column portion having a lower water inlet or feed space and, an arrangement for supporting packing therein. Also, a downcomer arrangement is provided in an upstream section of each chamber, for feed of water into the column portion lower inlet or feed space. Also, each chamber includes a by-pass means associated therewith, to accommodate plugging of the reaction chamber should same occur, as described below.

The above features will be understood, by reference to the following description of chamber 26. It will be, again, understood that features analogous to those described with respect to chamber 26 may, such as for the preferred embodiment shown, be found with respect to each of the chambers 26, 27, 28, 29 and 30, except where indicated.

Figure 3:
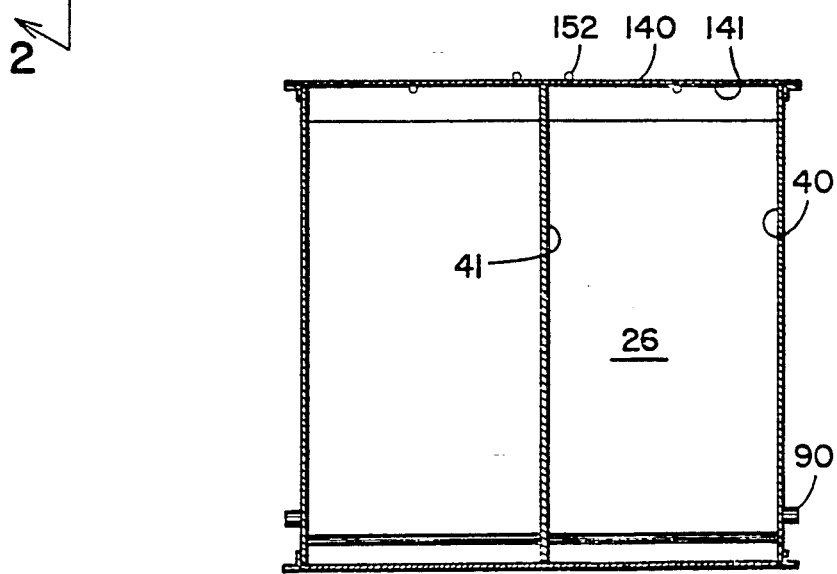
FIG. 3 is an enlarged, fragmentary, end cross-sectional view taken generally along line 3—3, FIG. 2.

Referring to FIG. 3, chamber 26 includes opposite sidewalls or retaining walls 40 and 41. Referring to FIG. 2, chamber 26 also includes first and second end walls 43 and 44. Further, chamber 26 includes a bottom wall 49, and an inner wall, comprising baffle 50. Baffle 50, sidewalls 40 and 41, and end wall 44 define a vertical reaction column or column portion 53. The baffle 50 has an upper end 54 and a lower end 55. Analogously, the column portion 53 includes an upper end portion 56 and a lower end portion 57. Mounted in the lower end portion 57 is a support arrangement 58 for supporting packing or biomass support material 59 received within column 53. Support arrangement 58 may, for example, be a grid spaced from bottom wall 49 by a distance $d_1$, to form a lower water inlet chamber area or feed space 60.

Support material 59 may be any of a variety if types of material utilizable for the support of a biomass thereon, to generate cleaning of contaminated water. The material 59, for example, may comprise rock, wood lath or plastic materials. One useful material is a polyvinyl chloride intalox support available from Norton Stoneware, Akron, Ohio.

The support material 59 may be relatively large, and immobile, pieces of material; or, the packing 59 may comprise small, easily fluidized, pieces of plastic material or the like. This latter type of packing may be utilized to form a fluidized bed, i.e., a bed which can circulate, rather than remain stationary, in the column 53.

Any of a wide variety of microbial materials may be immobilized on support material 59, by a variety of techniques. Also, the support material and/or the immobilized microbial material may differ from chamber-to-chamber. Further, even within the same chamber or column, mixes, or layers, of a variety of materials may be utilized. It is noted that in practice, biomass populations in various chambers will vary in time, even if they start out similar, due to different exposures to contaminants.

An effective method of loading microbial material onto the support material, is to pass feedwater including the microorganisms therein through the column. Typically this is done through a plurality of recycling steps. For many applications the biomass can be established with natural microflora, from a natural source of water. For certain preferred applications of the present invention, however, stages of the various chambers are in part established through inoculation. That is, selected microbial material is put into the feedwater, to help establish preferred, staged, microbial systems. In this manner, removal of toxic material early in the treatment process, can be facilitated.

In general, grid 58 is of sufficient strength, and size, to support material 59 above space 60. Space 60 preferably extends completely between end wall 44 and baffle 50, and also between sidewalls 40 and 41. In this manner, as will be understood from further descriptions, water flowing into column 53 will be readily fed completely thereacross.

Still referring to FIG. 2, the lower end 55 of baffle 53 is spaced a distance d2, from lower wall 49. Space 61 between the lower end 55 and the bottom wall 49 provides for inlet flow of water to column 53. That is, in general, a typical operation of column 53 is with water to be treated flowing upwardly therethrough, along the path generally designated by arrow 65.

Water is fed into column 53, by means of downcomer arrangement 75. The downcomer comprises a vertical channel 76 positioned between end wall 43 and baffle 50. Water is fed into downcomer channel 76 at an upper portion 78 thereof, as indicated at arrow 80. In particular, the water is provided by means of inlet 7. The water flows downwardly to end 55 of baffle 53, and into chamber 60. Under appropriate pressure, the water is forced upwardly along the path of arrow 65, through packing 59. As the water passes through packing 59, organics in the water are acted upon by immobilized microbial agents. This will lead to at least a partial purification of water passing through the column 53.

If the microbial activity to take place in chamber 26 is aerobic, it will be desirable to supply air to column 53. Referring again to FIG. 2, an air inlet system or manifold 85 is shown in region 60, air inlet system 85 being fed through manifold and pipe arrangement 86. Air moving into chamber 53, through pipe arrangement 86 and inlet arrangement 85, may be as provided by a conventional blower 19 or the like. That is, for many arrangements according to the present invention compressed air need not be used, since the chambers 26 may be relatively short in height, i.e., in the order of 4-5 ft. The inlet arrangement 85 may comprise any of a variety of types of bubble generator/dispersion arrangements. For example, a main manifold and porous finger arrangement could be used.

If an aerobic process is conducted in chamber 26, and air is fed into chamber 60 by inlet arrangement 85, then due to the presence of considerable sparged air in the water, fluid in chamber in 53 will generally be less dense then fluid in downcomer channel 76. As a result, water will be forced through column 53 without a substantial head differential between downcomer channel 76 and column 53. In fact, in some instances it has been observed that, with sufficient air introduction, a negative head differential between a downcomer channel 76 and an associated column 53 can be obtained.

It will be understood that open region 60 insures that at least as water is initially loaded onto vertical column 53, there is no substantial lateral or transverse gradient of loading. That is, chamber 60 provides for a generally even loading of water to the total cross-sectional area of column 53, along grid 58.

Chamber 26 includes a lower, central, drain 90, FIG. 1. Drain 90 may be utilized to drain water and/or waste biomass material outwardly from column 53.

The typical flow path outwardly from chamber 26, to the next chamber 27, is indicated generally at arrow 95. In particular, water flows over an upper end 96 of end wall 44, and into the downcomer channel 97 for chamber 27. In this manner, water can flow, in series, among a plurality of chambers 25.

Sometimes a vertical column may become plugged. For example the biomass and the column may grow to such an extent that water can only very slowly trickle therethrough. Should this occur, for many column arrangements a plug or fluid back-up, with flooding, would occur. Arrangement 1, FIG. 2, includes means protecting against flooding. In particular, attention is directed to baffle 100, for chamber 27. Baffle 100 includes an upper end 101 which terminates short of the upper areas 105 and 106 of the side walls of adjacent chambers 26 and 27. It will be understood that should vertical column 110, for chamber 27, become substantially plugged, water flowing down downcomer 97 will be backed-up. Should this occur, water flowing outwardly from the upper end area 105 of column 53 will simply pass over end 101 of baffle 110 in the direction indicated by arrow 111. In this manner, water flow can by-pass column 110 and directly flow into the next adjacent downstream downcomer 115, for chamber 28, as indicated at arrow 119. This generally requires that the upper end of each downstream wall (ex. wall 44) be below the upper end 54 of each baffle 50. That is, generally water overflowing the baffle should be capable of flow not only above the support material, but to an outlet below the upper region of the baffle and preferably at or below an inlet for the chamber. Also, preferably each baffle extends no higher than upstream baffles. Most preferably each baffle is at least about 0.25 inches shorter than the next upstream baffle, to ensure proper by passing flow, when necessary. It is noted that the first baffle 53 is much higher than the remaining baffles, since it is located in the region of the inlet.

The overflow feature is very important for at least two reasons. First, again, it provides for accommodation of plugging without substantial flooding and/or interruption with reactor operation. Secondly, it provides for a certain amount of self-governing. In particular, once deprived of substantial water flow, with nutrient organic material, the biomass in plugged column 110 will begin to die off. In general, should this occur portions of the biomass material will become released from the support material therein. In time, sufficient material will be released to unplug the column. At that point, flow will automatically be reestablished through downcomer 97, and upwardly through column 110. Thus, the system described, in general, reestablishes itself should any particular column become plugged. Correction can be facilitated by control of air flow and/or temperature in any individual column.

Still referring to FIG. 2, a screen arrangement 120 between the upper end 96 of sidewall 44, and an upper portion 105 of column 53, prevents flow of bulk material, such as support material 59, into chamber 27 along the path of arrow 95. It will be understood that useful screen arrangements 120 may be oriented differently than shown; for example it may be oriented between wall 44 and baffle 100, under certain circumstances. This is shown by screens 121 in other columns. Screen 120 is particularly well-suited for use with a fluidized bed of packing material. Screens 121 are well adapted for use with traps 122 to collect loose organic material from the associated columns. Such screens can be made so that they can ba easily removed, cleaned and replaced, as desired.

It is also noted that with respect to the last chamber 30, there is no recycling type by-pass arrangement shown. That is, should vertical column 30 become plugged, water will pass over end 131 of baffle 132, and eventually into outlet chamber 134, toward outlet 9 (and column 130 is bypassed). Thus, water flowing outwardly from outlet 9 may have completely bypassed chamber 130. It will be understood that, if desired, means could be provided in association with end 131 of baffle 132 or outlet 9 such that overflow water, i.e., water passing over end 131, is directed elsewhere than to outlet channel 134. For example, the water could be recycled into one of the upstream chambers, if desired.

As previously described, a driving force arrangement may be conveniently provided by means of a blower providing air to a lower portion of each chamber. Again, the driving force results at least in part from the fact that aerated water within the vertical column of each chamber will be less dense, in general, than the water in the preceding downcomer channel. Thus, driving force can be provided with relatively little head differential across the arrangement 1, and in some instances even a negative head differential can be tolerated. Valves 135 can be used to control air flow into the chambers 25.

In some instances, however, anaerobic processes may be conducted in one or more of the colors. That is, it may be desirable to avoid providing an air flow into a selected column. Should this occur, then it will typically be desirable to maintain a small head differential between the previous downcomer channel and the associated column, in order to insure a driving force to water passing through the column.

It will be understood from examination of FIG. 2, that, in general, relative wall heights, baffle heights, etc. have been provided, to accommodate a relatively small head differential. Later in this description suggested dimensions for an arrangement 1 according to the present invention are made. For an arrangement having such dimensions, generally a head differential of only about 1 to 4 inches (2.5–10.2 cm) across the entire five columns is sufficient to provide for a substantial flow of water therethrough.

In some instances, the contaminants of the water may be relatively volatile. Thus, the contaminated water may give off unpleasant and in some instances even harmful fumes. Arrangement 1 is provided with a cover arrangement 140 thereon, FIGS. 2 and 3, so that all of the chambers are covered, substantially retaining volatiles within an air space 141 along the top of all associated chambers, 26 through 30. The cover 140 is provided with a central vent 142, to vent the volatiles outwardly from space 141. It will be understood that the vent 142 may be used to direct the volatiles through desired scrubbing, cleaning, or filtering arrangements, etc., as desired.

Figure 4:
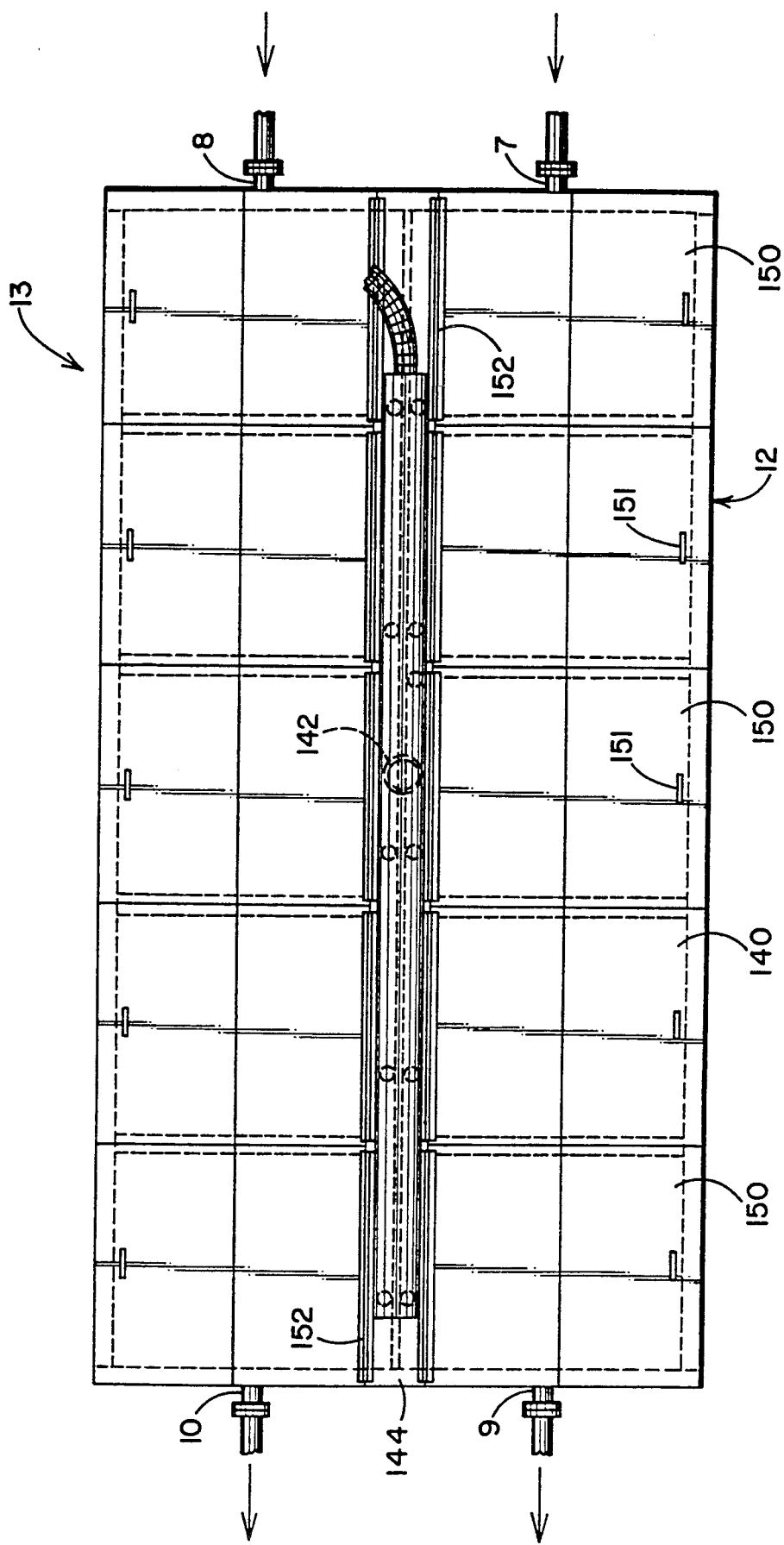
FIG. 4 is a top plan view of the arrangement shown in FIGS. 1-3.

Referring to FIG. 4, vent 142 is shown disposed on a center line 144 between adjacent parallel arrangements 12 and 13. Thus, vent 142 operates with respect to both arrangements 12 and 13, simultaneously.

Access to individual columns may be desired. Referring to FIGS. 1 and 4, a portion 150 of cover 140 associated with each column is individually, hingedly, mounted, so it can be opened to provide access to the associated column. Handles 151 facilitate opening, along hinge line 152.

The arrangement 1 may be constructed from a variety of materials including metal, wood, treated wood, plastic and composite materials. In general, a relatively lightweight, sturdy, leakproof arrangement will be preferred.

As previously suggested, preferably arrangement 1 is constructed in a size and manner so as to be portable, either in the back of a truck or on a trailer. The following dimensions may be utilized to yield such an arrangement. It will be understood, however, that the dimensions are representational only. The dimensions are as follows: width of chamber 26 between sidewalls 40 and 41, 3 ft.; length of chamber 26 between end walls 43 and 44, 2.25 ft.; height of chamber 26 between bottom wall 49 and cover 140, 6 ft.; space between baffle and 55 and bottom wall 49, 0.25 ft.; height of wall 44 between bottom wall 49 and upper end 96, 5.75 ft.; space between end 101 of wall 100 and cover 140, 0.5 ft.; difference between height of wall 44 and height of wall 100, 0.5 ft.; distance between wall 43 and wall 53 (i.e. distance between end walls of downcomer channel 76) 0.25 ft.; distance between screen 58 and bottom wall 49, about 0.5 ft. For such an arrangement, the depth of support material for each chamber would be about 4.75 ft. It is estimated that such an arrangement could be operated at flow rates between about 50 and 6,000 gallons/per hour, in normal operation and with a wide variety of immobilized biomass arrangements. Of course, a variety of flow rates may be utilized, depending especially on the extent of contamination.

It will be understood that in some instances it may be desirable to provide variations in temperature among the various chambers 25, or to provide a set temperature among them all. This may be accomplished utilizing conventional heater and/or cooler means, for example as illustrated at 160, in association with individual chambers. Also, direct solar heating of chambers may be used. Typically, non-light-transparent materials will be used for the reactor, to avoid algae growth therein.

The rectangular geometry of each column offers advantages. Fabrication of the reactor is greatly facilitated, since the outer shell can be simply a large rectangular tank, with columns and downcomers formed by placement of baffles in the tank. Reactors can be readily fabricated, for example, from fibre glass, aluminum and/or steel.

The height of each column is also an important parameter. Relatively tall columns may suffer from oxygen depletion in upper regions, since the air bubbles may have been substantially depleted of oxygen by the biomass, by the time they travel to the upper regions of the column. Generally, columns under 6 feet (about 2 meters) in height are not observed to suffer from substantial oxygen depletion, even with a fully developed biomass. The particular reactor design shown ensures sufficient aeration by positioning a plurality of short columns and series. The result is that each relatively short column can be readily aerated, even with a simple blower instead of an air compressor.

Preferably the height to area ratio (H/A) of each column should be in the range of 0.5 to 1.0. Most preferably the ratio is about 0.88. These ratios help insure efficient operation.

It is also noted that a substantial amount of mixing will occur in each downcomer channel, for example channel 76. This generates a more efficient purification process, with virtually no likelihood of channeling throughout the reactor. Advantages with respect to relatively large, single column, arrangements are apparent.

It is noted that some fluid from a given downcomer could be pumped to an upstream downcomer, to generate recycling or to increase flow in that portion of the apparatus without affecting the flow rate and residence time in the rest of the assembly. It is also noted that the air flow to each column can be varied, to accommodate different processes.

Each cell or chamber may have various introductory pipes or the like associated therewith, for variations in nutrients, pH etc. This may be accommodated through a variety of conventional means. An introduction system for one column (i.e. the column 130 of chamber 25) is indicated generally at 175, as a feed pipe. This system could be fed by a pump, not shown.

Referring to the drawings generally, the column portion bypass arrangement for column 26 comprises a fluid flow communication arrangement in an upper portion of the baffle member 53, i.e. the upper end 54 of baffle member 53 terminates short of cover 140 and an upper portion of the sidewalls 40 and 41. Further, the fluid flow communication arrangement, just described, is generally positioned above flow inlet 7. Also, in general, the drain arrangement and upper end 96 of wall 44 is positioned at the level of, or below, the inlet level for water at position 78. Further, in general support material 59 terminates at the level of, or below, the drain 96 from the column 26. Also, preferably downstream baffles extend no higher than upstream baffles, so that overflow in a downstream direction is facilitated.

In operation, a biomass can be established in the reactor 1, by passing a feed water therethrough, having an indigenous microbial consortium therein. The microbes will establish themselves, in stages, on the various support materials. In preferred applications, and according to preferred methods, the water during establishment of the consortium is inoculated with a population of preferred microbes for conduction of purification with respect to elements in the feedwater to be processed. In this manner, efficiency of the operation can be enhanced considerably. This will be better understood from examples 4 and 5 below.

It is noted that the invention has been described with respect to flow over and under members, such as the baffles. In some embodiments, apertures could be appropriately positioned to allow flow through those members, in analogous regions, to accomplish analogous results.

Objects advantages and applications to the present invention will be further understood from the following experimental descriptions.

EXPERIMENT 1

A pilot scale 2 column (2 chamber) reactor, otherwise according to the general design of FIG. 1, with transparent sides, was fabricated to study hydraulic effects. Each column was 2 ft. by 2 ft. in cross-section, and 3 ft. in height (total volume 24 cubic ft.). Each was filled with one-half inch Intalox packing. Die experiments were preformed, to study the flow of mixing patterns throughout the reactor. A point source introduction of food coloring into a downcomer was disbursed within the first six-to-twelve inches, indicating good inter-column mixing. A plug flow pattern was observed in the columns, with slightly more rapid flow along the inlet wall of a column. The introduction of concurrent air flow lessened the channeling effect and insured more even plug flow.

With no aeration, and a flow rate of 24 gpm (gallons per minute), —corresponding to a residence time of 0.12 hours—there was a 0.17 inch (0.43 cm) head between the first and second columns. As aeration was increased, by means of a blower, the head difference diminished until the level in the downcomer was lower than in the succeeding column (i.e. a negative differential was obtained). Since it is foreseen that the reactor will generally be operated at residence times on the order of about 1 hour, a negligible head loss can be incurred across the entire flow path, in typical applications.

EXPERIMENT 2

Figure 5:
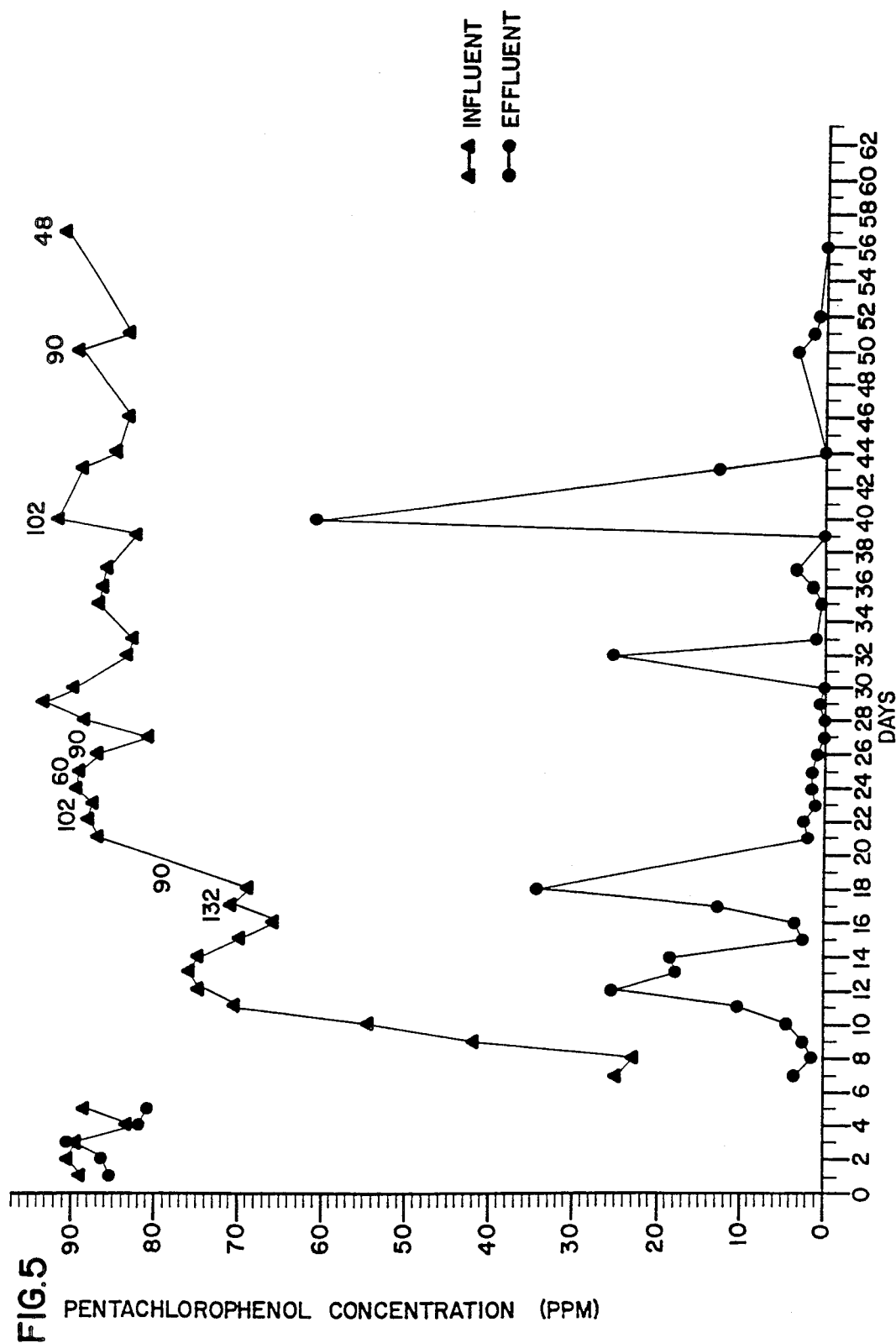
FIG. 5 is a graphic representation showing a plot of daily contaminant concentration in the influent and effluent from a reactor, according to an experiment reported herein.

The pilot scale reactor described in Experiment 1 was employed to treat groundwater contaminated with pentachlorophenol (PCP). The groundwater was pumped directly from a purge well into a mix tank, where nutrient addition and pH adjustment took place. Although there were many other compounds present in the groundwater, pentachlorophenol was the target contaminant. FIG. 5 shows a plot of daily PCP concentration in the influent and effluent. The numbers above the top curve are the flow rates in gallons per hour.

For six days the reactor was put on line and allowed to develop a biofilm of indigenous organisms. On the seventh day, the mix tank was inoculated with bacteria possessing the capability of pentachlorophenol degradation, and the system was run on partial recycle back to the mix tank. The biofilm was totally established by the passage of ten days, and was run for a total of 70 days. The influent PCP concentration varied between 75 and 95 ppm, and the effluent concentration was generally below 5 ppm. The large spikes on about the 18th, 32nd and 40th days resulted from mechanical failures such as loss of aeration, or loss of heat. The specific activity for PCP degradation was 40–50 mg. per liter per hour on a consistent basis, and reached a maximum of 53 mg. per liter per hour. The reactor also removed non-target compounds, known collectively as biological oxygen demand (BOD). However, these data were not collected. The experiment demonstrated use of the reactor for removal of toxic priority pollutant, with an amended microbial consortium.

EXPERIMENT 3

Figure 6:
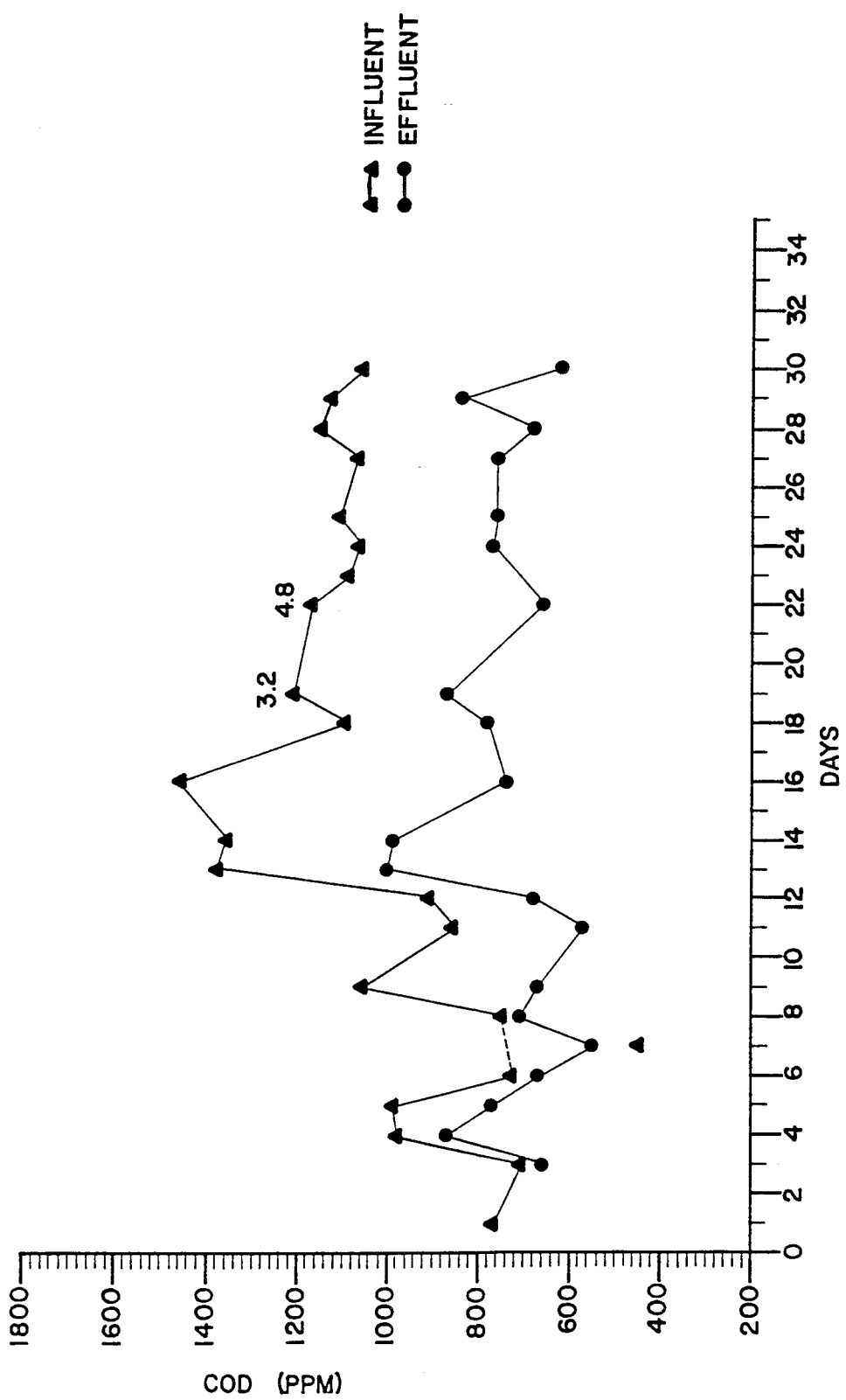
FIG. 6 is a graphic representation of a plot of influent and effluent COD, according to an experiment reported herein.

A three column pilot scale reactor was fabricated to perform demonstration treatability studies. Each column as 2 ft. by 3 ft. in cross-section and 4 ft. in height (total volume of 72 cubic ft. or 540 gallons). The reactor was employed to treat surface water at a wood treating site, with removal of biological oxygen demand (BOD) as the objective. Water pretreatment included nutrient addition, pH adjustment and heating. FIG. 6 shows a daily plot of influent and effluent COD (chemical oxygen demand), with the flow rate given in gpm on the top curve. The influent COD concentrations generally varied between about 1000 and 1400 ppm, and the effluent was reduced to between about 500 and 900 ppm.

The specific activity for BOD removal averaged 210 mg/l/hr over the three week period, with a maximum of 430 mg/l/hr. This rate compares favorably with design rates for activated sludge treatment. This experiment shows that the reactor can be employed for the effective removal of chemical oxygen demand from wastewater. It is noted that for this experiment the difference in influent and effluent COD is identified as the BOD.

The effectiveness of the reactor design for the treatment of both toxic and non-toxic wastewaters is due in part to multistage treatment. In the course of operation, distinct microbial populations will develop in each section of the reactor. For example, those organisms most suited for degradation of toxic carbon compounds at high concentration will dominate the upstream columns. Conversely, those organisms more suited to degrade the compounds which are left over will establish themselves in the downstream columns. In some instances, very pronounced multistage treatments may be accomplished in the same reactor. For example, aerobic and anaerobic steps in series are easily realized by simply cutting off air flow through a portion of the column. Likewise, various microbial populations can be established by the introduction of key nutrients at selected points in the reactor.

EXPERIMENT 4

The three column pilot scale reactor described previously (Experiment 3) was employed for the treatment of wastewater from a wood treating site. The water was characterized both a high COD content and a high level of toxics. The toxics were identified as phenolic compounds. For the study, the reactor was initially seeded with organisms indigenous to the treatment site. Thus, it represented the case of spontaneous development of a staged microbial system. The biofilm which developed upon seeding with indigenous organisms was a dark brown to black slime, observed to coat the surface of the column support material.

Figure 7:
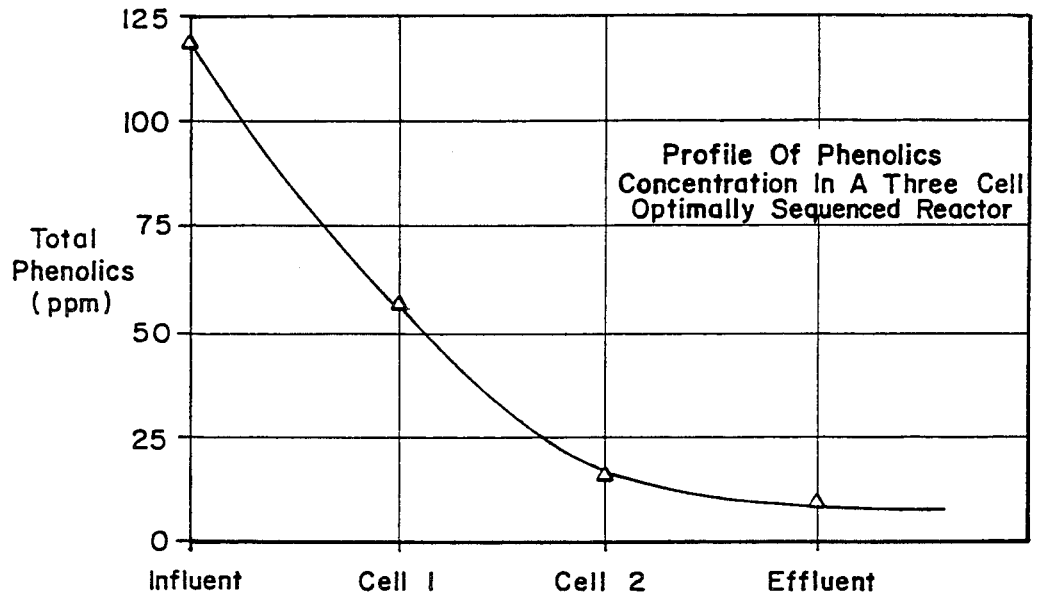
FIG. 7 is a graphic representation of a plot of phenolics concentration at various stages in a reactor, according to an experiment recorded herein.

FIG. 7 shows a plot of phenolics concentration at each stage of the reactor. It is evident that the majority of the phenolics were removed in the first column of the reactor, leaving low concentrations in the second and third cells. The term "sequenced" or "optimally sequenced" as used in the drawing is meant to refer to achievement of some optimization in reactor capability due to sequencing or staging.

Figure 8:
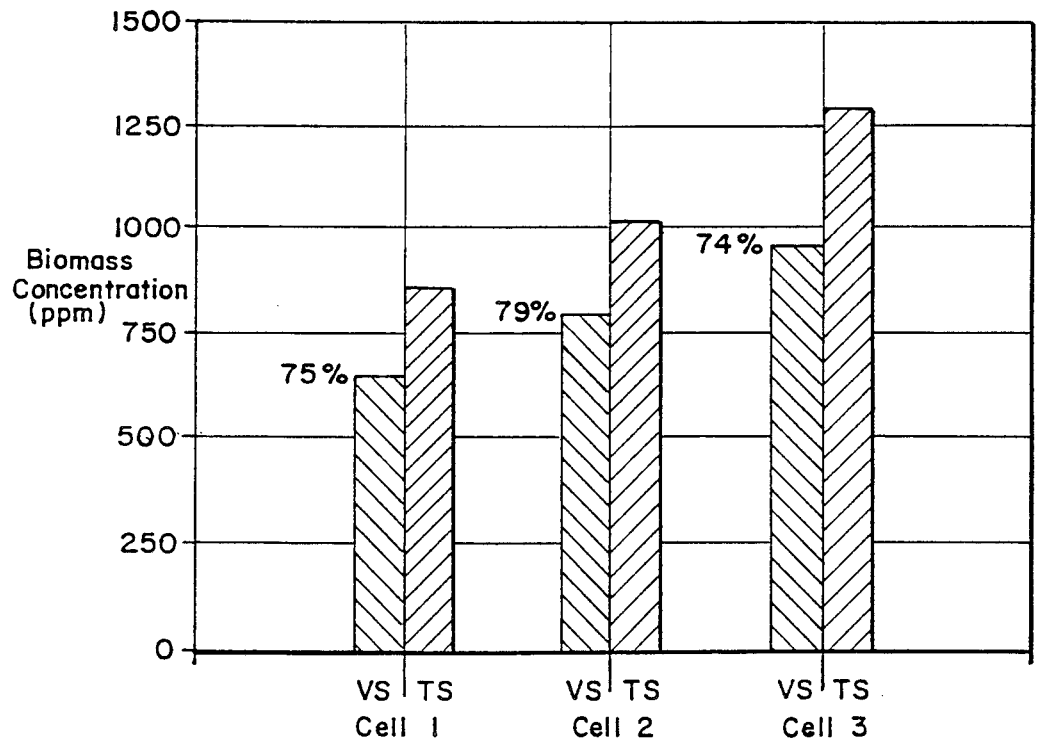
FIG. 8 is a plot showing actual biomass concentrations in the experiment represented in FIG. 7, and described herein.

FIG. 8 shows the actual biomass concentrations in each column of the reactor. In the figure, TS stands for total solids immobilized in the packing, and VS stands for the fraction of total solids lost on ignition (volatile solids). The volatile solids concentration is normally identified as the biomass concentration, although a small fraction may be non-biological. FIG. 8 indicates that the biomass concentrations actually increase in the second and the third columns of the reactor. This suggests that a small population of microbes with a high capacity for phenolics degradation is immobilized in the first column of the reactor. The second and third columns have higher microbe populations, and hence will perform a wider range of metabolic functions. That is, with the phenolics removed, the relatively high microbe populations in the later chambers can be effective in removing other organic compounds. The % figures in FIG. 8 represent $VS/TS \times 100$.

EXPERIMENT 5

This experiment indicates advantages obtainable through inoculation of feedwater, in establishing the microbe population in the reactor. In this experiment, a reactor was used for ground water contaminated with penachloraphenol (PCP). PCP is highly toxic to most microorganisms, and is widely used a bactericide. For experiment, a single column 6 ft. packed column was first seeded with microorganisms indigenous to the treatment site. The indigenous microbes established a biofilm on the column packing. Subsequently, a previously isolated bacterium (flavobacterium) was inoculated in the reactor. The flavobacterium used had a highly specific metabolic capability for the degradation of PCP. The inoculation procedure involved suspending a high concentration of flavobacterium ($10^8$ to $10^9$ cells per milliliter) in the feedwaste water and recirculating the water through the reactor. After one to three days of recycle, the bacteria attaches to the already established biofilm.

Figure 9:
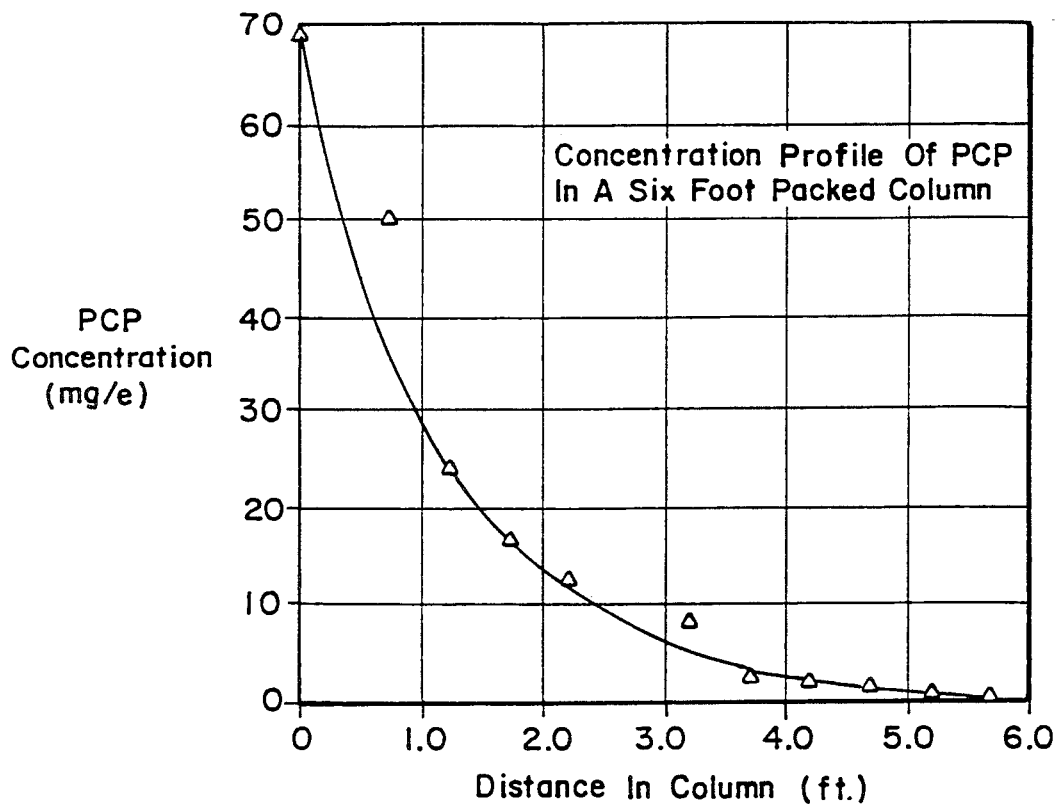
FIG. 9 shows a profile of PCP concentration across a packed column for experiment described herein.
Figure 10:
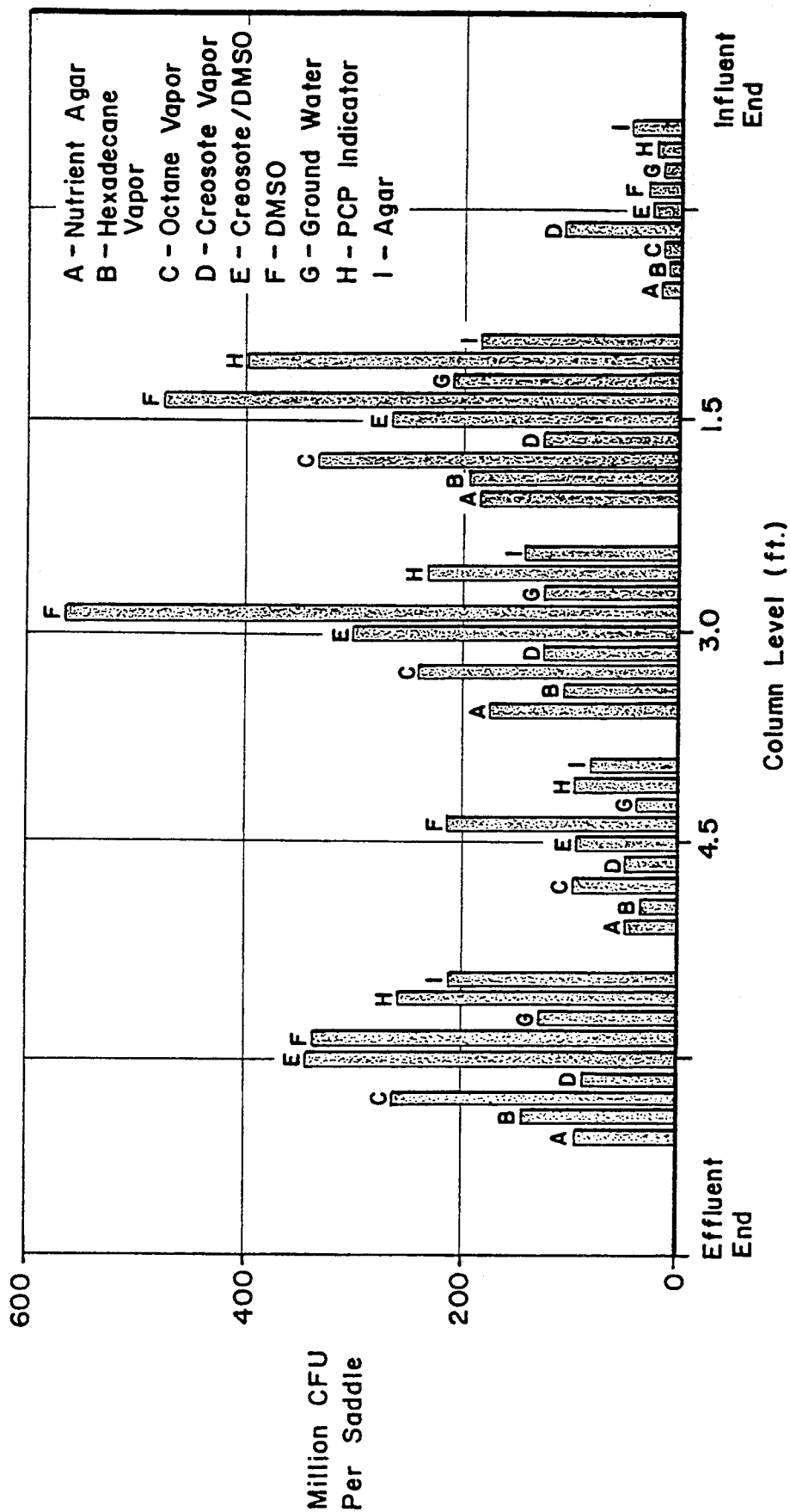
FIG. 10 shows a plot of biomass concentration in the reactor, corresponding to an experiment represented in FIG. 9 and described herein.

FIG. 9 shows a profile of PCP concentration across the packed column. The bulk of the PCP removal occurred in the most upstream portion of the reactor, and as the concentration was reduced the degradation tapered off. FIG. 10 is a corresponding plot of biomass concentration to the reactor. Data are plate counts, proportional to the total mass concentration, with microbes taken from the column packing at various steps. The influent section plate counts are very low. The higher plate counts in downstream sections of the reactor indicate a greater amount to microbe population and diversity in those sections.

FIG. 10 gives an indicatio nof the microbial diversity in the reactor at each level. Organisms were plates onto the various media identified in the figure as A-I. Organisms able to grow on a specific carbon source, for example octane (c), were enumerated by subsequent growth on the plates. The number of colonies (colony forming units) were counted, to obtain the reported CFU values.

It is noted that the reactor used for this example only had a single column, however the gradient from upper stream portions to lower stream portions of the column indicate that a highly specific population of PCP degraders can be established in the influent sections of reactor, with a more broad population being immobilized in downstream sections.

It is to be understood that while certain examples in experiments have been described herein, the invention is not to be limited to the specific experimental procedures and/or structures described is shown.

What is claimed and desired to be secured for Letters Patent is as follows:

1. A method of purifying water from a site contaminated with toxic and non-toxic organic materials; said method including the steps of:
   (a) providing a reactor having an upstream end and a downstream end and comprising a plurality of treatment chambers oriented in series; each of said chambers having an upstream downcomer portion and a downstream column portion;
   (i) each column portion having a downstream wall;
   (ii) each chamber including a baffle member therein dividing said chamber into said downcomer portion and said column portion; each baffle member, except for a first, most upstream baffle member, having less upward extensions than a next upstream baffle member; and, the downstream wall of each column portion having less upward extension than a next downstream baffle member;

(b) providing biomasss support material in each of said chamber column portions;

(c) establishing a microbial consortium, of biomass capable of removing selected organic material in water to be treated, in said reactor by directing feed of water including microbial species indigenous to the treatment site through said reactor in direction from said upstream end to said downstream end;

(d) purifying water by directing water to be purified from said upstream end to said downstream end; and, (e) said steps of establishing a microbial consortium and purifying water both including passing water upwardly through biomass support material in each of said treatment chambers.

2. A method according to claim 1 wherein:

(a) said step of providing a reactor includes providing a reactor having at least 3 treatment chambers oriented in series.

3. A method according to claim 2 including a step of bubbling air through at least one of said treatment chambers, during said step of establishing a microbial consortium in said reactor.

4. A method according to claim 1 including a step of bubbling air through at least one of said treatment chambers, during said step of establishing a microbial consortium in said reactor.

5. A method according to claim 1 wherein:

(a) said steps of establishing a microbial consortium and modifying the microbial consortium collectively comprise development of a biomass gradient throughout said reactor characterized by: a relatively greater population of microorganisms capable of removing toxic organic species, from the water to be purified, toward the upstream end of the rector; and, a relatively greater overall population of microorganisms toward a downstream end of the reactor.

6. A method according to claim 1 including a step of:

(a) modifying the microbial consortium established by step (c) by thereafter directing, through the reactor from the upstream end to the downstream end, water which has been inoculated with microorganisms particularly adapted for removal of selected contaminants in the water to be purified.

7. A method according to claim 6 including a step of:

(a) providing as a microorganism with which water used in step (c) has been inoculated, a microorganism particularly adapted for removal of a toxic contaminant in the water to be purified.

8. A method according to claim 6 wherein:

(a) said steps of establishing a microbial consortium and modifying the established microbial consortium collectively comprise development of a biomass gradiant throughout said reactor characterized by: a relatively greater population of microorganisms capable of removing toxic organic species, from the water to be purified, toward the upstream end of the reactor; and, a relatively greater overall population of microoganisms toward a downstream end of the reactor.

9. A method according to claim 6 wherein:

(a) said step of establishing a microbial consortium comprises passing water upwardly through biomass support material in each of said treatment chambers;

said step of modifying the established microbial consortium comprises passing inoculated water upwardly through biomass support material in each of the treatment chambers; and, (c) said step of directing water to be purified through the reactor comprises passing the water to be purified upwardly through biomass support material in each of the treatment chambers.

10. A method according to claim 6 wherein:

(a) said step of modifying the microbial consortium established by step (c) comprises passing inoculated water upwardly through biomass support material in each of the treatment chambers.

* * * * *